Patented Apr. 8, 1930

1,754,156

UNITED STATES PATENT OFFICE

HERMANN FRISCHER, OF COLOGNE-LINDENTHAL, GERMANY

PRODUCTION OF ACIDS

No Drawing. Application filed May 16, 1927, Serial No. 191,919, and in Germany May 26, 1926.

My invention refers to the production of inorganic acids from the respective salts, and more especially to the production of acids, such as nitric acid, from nitrates, by acting thereon with a stronger acid, for instance sulfuric acid. It is an object of my invention to provide means whereby the reaction between the stronger acid and the salts of the weaker acid is promoted to such an extent that less of the stronger acid and lower temperatures are required than according to the practice hitherto followed.

As is well known to those skilled in the art, acids such as nitric acid are produced by reacting on nitrates with sulfuric acid, the quantity of sulfuric acid required exceeding the molecular quantity. More particularly if acting on nitrates for the production of nitric acid, a comparatively large surplus of sulfuric acid must be employed, provided that a high yield of nitric acid shall be obtained. In the present day practice the quantity of sulfuric acid employed is such that an acid sodium sulfate is formed, as a rule a so-called technical bisulfate.

Nowadays 100 kgs. sodium nitrate require about 93 kgs. of a 98 per cent sulfuric acid.

I have now found that in all cases substantially only the molecular quantity of sulfuric acid will be required, provided that the salts to be acted upon in finely ground condition are mixed not only with sulfuric acid, but also with a small quantity of the acid which shall be obtained therefrom, in the case of a nitrate with nitric acid. By thus proceeding the quantity of 93 kgs. sulfuric acid required for producing nitric acid from 100 kgs. sodium nitrate is reduced to about 60 kgs. An addition of about 5 to 10 per cent of the acids to be produced to the respective salt has been found sufficient for this purpose. If such quantity of the acid to be produced is added to the salt together with the sulfuric acid, a fluid homogeneous mixture is formed, which allows operating in a continuous manner. In view of the homogeneity of the mixture the operation can be carried out advantageously in horizontal cylindrical stills heated from within or from without, these stills being either provided with agitating devices or being revoluble. The use of such cylinders as compared with the stills hitherto used involves the double advantage that the material acted upon is kept in contact with the entire heating surface, while in an ordinary still heat is conveyed mainly to the bottom layer of the charge. If non-homogeneous mixtures are operated upon in horizontal cylindrical stills, there is a danger that the liquid phase separates from the solid phase.

When acting on nitrates to produce nitric acid, the invention offers the further advantage that instead of the acid bisulfate hitherto obtained an almost neutral sulfate is obtained, which commands a higher price.

Moreover, while according to the old method, when acting on nitrates for the production of technically neutral sulfates, high temperatures ranging between 600 to 900° C. were required, my novel method can be carried out at temperatures ranging between 200 and 350° C.

I have further found that the reaction between the salts and the acids can be materially accelerated by operating under reduced pressure. Thus, if the operation is carried through at a pressure of 500 to 600 mms. of mercury below normal, the time for complete reaction is reduced to about two thirds. Furthermore the operation at reduced pressure also involves a reduction in temperature. Thus, for instance, the reaction between sodium nitrate and sulfuric acid, which took place hitherto at 300 to 350° C., will now occur already between 200 and 240° C.

The acids can be admixed to the salts either without or within the reaction vessels. When admixing the acids to the salts outside of the stills, I prefer proceeding in such manner that first only part of the salt to be operated upon is mixed with some of the acid which shall be produced, the balance of the salt and the reacting acid, such as sulfuric acid, being added to the mixture.

If proceeding in this manner considerably smaller quantities of the acid to be produced will be required. For instance, if 2000 kgs. sodium nitrate shall be acted upon with sulfuric acid, it suffices to mix only about 50 kgs. of the salt with about 25 kgs. nitric acid, the balance of nitrate and the sulfuric acid being admixed to the mixture simultaneously. As shown by this example even as little as about 1.25 per cent nitric acid will suffice as an addition to the reacting mixture. In consequence thereof less steam is consumed and the time required for the operation is shortened.

Various changes may be made in the details disclosed in the foregoing specification without departing from the invention or sacrificing the advantages thereof.

I claim:—

1. In the process of producing an inorganic acid by acting on one of its salts with another acid to produce a neutral salt of said other acid, the step of embodying in the mixture of the starting products a small quantity of acid of the kind which shall be produced.

2. In the process of producing an inorganic acid by acting on one of its salts with another acid to produce a neutral salt of said other acid, the step of embodying in the salt to be acted upon a small quanity of acid of the kind which shall be produced.

3. In the process of producing an inorganic acid by acting on one of its salts with another acid to produce a neutral salt of said other acid, the step of embodying in a portion of the salt to be acted upon a small quantity of acid of the kind which shall be produced.

4. In the process of producing nitric acid by acting on a nitrate with sulfuric acid, the step of embodying in the mixture of the starting products a small quantity of nitric acid.

5. In the process of producing nitric acid by acting on a nitrate with sulfuric acid, the step of embodying in a portion of the nitrate to be acted upon a small quantity of nitric acid.

6. The process of producing an inorganic acid comprising causing another acid to act at a pressure below normal on a mixture of a salt of the acid to be produced with a small quantity of acid of the kind to be produced.

7. The process of producing an inorganic acid other than sulfuric acid comprising causing sulfuric acid to act at a pressure below normal on a mixture of a salt of the acid to be produced with a small quantity of acid of the kind to be produced.

8. The process of producing nitric acid comprising causing sulfuric acid to act at a pressure substantially not exceeding 600 mms. mercury column on a mixture of sodium nitrate and some nitric acid at a temperature below 250° C.

9. The process of producing nitric acid comprising mixing 50 parts by weight sodium nitrate with 25 parts nitric acid, adding to the mixture 1950 parts sodium nitrate and 60 parts sulfuric acid of 98 per cent, and heating to start the reaction.

In testimony whereof I affix my signature.

HERMANN FRISCHER.